United States Patent
Grose et al.

(10) Patent No.: US 9,896,970 B2
(45) Date of Patent: Feb. 20, 2018

(54) METHOD AND SYSTEM FOR SEALING AN ANNULUS

(71) Applicant: General Electric Company, Schenectady, NY (US)

(72) Inventors: Kyle Andrew Grose, Cincinnati, OH (US); Arjan Johannes Hegeman, Cincinnati, OH (US); Andrew David Kemp, Maineville, OH (US); John Michael Pyles, West Chester, OH (US)

(73) Assignee: General Electric Company, Schenectady, NY (US)

(*) Notice: Subject to any disclaimer, the term of this patent is extended or adjusted under 35 U.S.C. 154(b) by 522 days.

(21) Appl. No.: 14/928,077

(22) Filed: Oct. 30, 2015

(65) Prior Publication Data
US 2016/0201565 A1 Jul. 14, 2016

Related U.S. Application Data

(60) Provisional application No. 62/079,795, filed on Nov. 14, 2014.

(51) Int. Cl.
F01D 25/24 (2006.01)
F02C 7/25 (2006.01)

(52) U.S. Cl.
CPC .............. F01D 25/24 (2013.01); F02C 7/25 (2013.01); F05D 2220/323 (2013.01);
(Continued)

(58) Field of Classification Search
CPC ...... F01D 25/24; F02C 7/25; F05D 2220/323; F05D 2230/60; F05D 2260/231; Y02T 50/672
See application file for complete search history.

(56) References Cited

U.S. PATENT DOCUMENTS 1,399,503 A   12/1921   McCrae
2,795,108 A    6/1957   Saldin
(Continued)

FOREIGN PATENT DOCUMENTS

CN    104093632 A    10/2014
DE   102008002847 A1  11/2008
(Continued)

OTHER PUBLICATIONS

First Office Action and Search issued in connection with corresponding CN Application No. 201511035911.9 dated Apr. 19, 2017.
(Continued)

Primary Examiner — Igor Kershteyn
(74) Attorney, Agent, or Firm — General Electric Company; Pamela A. Kachur

(57) ABSTRACT

A method and system for a compartment baffle system are provided. The compartment baffle system includes a first baffle portion extending along an axial length of a casing, the first baffle portion extending radially outwardly from an outer surface of the casing and a second baffle portion extending at least partially radially outwardly from the first baffle portion. The second baffle portion further includes a radially inner edge supported by the first baffle portion and a radially outer edge extending proximate an inner surface of a radially outer cowl. The compartment baffle system also includes a gap extending between the radially outer edge and the inner surface.

20 Claims, 6 Drawing Sheets

(52) U.S. Cl.
CPC .... *F05D 2230/60* (2013.01); *F05D 2260/231* (2013.01); *Y02T 50/672* (2013.01)

(56) References Cited

U.S. PATENT DOCUMENTS

| | | | |
|---|---|---|---|
| 3,053,283 A | 9/1962 | Allen et al. | |
| 4,165,609 A * | 8/1979 | Rudolph | F02K 1/386 181/213 |
| 4,215,536 A * | 8/1980 | Rudolph | F02K 1/386 181/213 |
| 5,156,360 A * | 10/1992 | Shine | B64D 29/00 244/129.1 |
| 5,211,535 A | 5/1993 | Martin et al. | |
| 5,291,672 A * | 3/1994 | Brown | F02K 1/383 181/213 |
| 5,524,846 A * | 6/1996 | Shine | B64D 27/00 244/121 |
| 5,524,847 A * | 6/1996 | Brodell | B64C 7/02 244/54 |
| 5,910,094 A | 6/1999 | Kraft et al. | |
| 6,199,371 B1 | 3/2001 | Brewer et al. | |
| 6,983,912 B2 * | 1/2006 | Connelly | B64D 29/02 244/119 |
| 8,070,099 B2 * | 12/2011 | McFarlane | B32B 25/02 244/121 |
| 2006/0112676 A1 | 6/2006 | Cowan et al. | |
| 2008/0286099 A1 | 11/2008 | Rao et al. | |
| 2013/0247574 A1 | 9/2013 | Patel et al. | |
| 2014/0212273 A1 | 7/2014 | Le Borgne | |

FOREIGN PATENT DOCUMENTS

| | | |
|---|---|---|
| EP | 0835805 A2 | 4/1998 |
| EP | 1006023 A2 | 6/2000 |
| EP | 1507116 A1 | 2/2005 |
| EP | 2549063 A1 | 1/2013 |
| FR | 2975735 A1 | 11/2012 |
| JP | 2000120446 A | 4/2000 |
| JP | 2008522096 A | 6/2008 |
| JP | 4946649 B2 | 6/2012 |
| WO | 2013053566 A1 | 4/2013 |

OTHER PUBLICATIONS

Unofficial English Translation of Japanese Notice of Allowance issued in connection with corresponding JP Application No. 2015-221706 dated Jan. 10, 2017.

European Search Report and Opinion issued in connection with corresponding EP Application No. 5194575.5 dated May 2, 2016.

* cited by examiner

METHOD AND SYSTEM FOR SEALING AN ANNULUS

CROSS-REFERENCE TO RELATED APPLICATIONS

This non-provisional application claims the benefit of priority under 35 U.S.C. § 119(e) to U.S. Provisional Patent Application No. 62/079,795, entitled "METHOD AND SYSTEM FOR SEALING AN ANNULUS", filed Nov. 14, 2014, which is herein incorporated in its entirety by reference.

BACKGROUND

This description relates to annular seals, and, more particularly, to a method and system for segregating annular compartments.

At least some known gas turbine engines used on airplanes include a core engine or gas generator circumscribed by a turbine casing formed of a composite material. The composite casing provides structural support to gas turbine engine components within a predetermined temperature range. Temperatures outside of the predetermined range may cause structural weakness, which may lead a reduced life or permanent damage to the casing. A radial outer compartment surrounding the casing typically houses auxiliary equipment, piping, and control devices. Cooling such equipment and devices typically uses ram air flow from outside the aircraft directed through the compartment and exhausted outside the aircraft. Typically, at least some of the piping traversing the compartment includes fuel or other combustible fluid and equipment and devices in the compartment may act as sources of ignition and/or additional fuel. A fire that ignites in one area of the compartment is free to travel throughout the compartment, raising a temperature of the casing beyond the predetermined range, which can weaken the composite casing enough to cause structural failure of the casing. Previous attempts to insulate the casing and/or discourage a spread of the fire add weight to the engine and limit a flow of cooling air to components located in the compartment.

BRIEF DESCRIPTION

In one embodiment, a compartment baffle system includes a first baffle portion extending along an axial length of a casing, the first baffle portion extending radially outwardly from an outer surface of the casing and a second baffle portion extending at least partially radially outwardly from the first baffle portion. The second baffle portion further includes a radially inner edge supported by the first baffle portion and a radially outer edge extending proximate an inner surface of a radially outer cowl. The compartment baffle system also includes a gap extending between the radially outer edge and the inner surface.

In another embodiment, a gas turbine engine includes a gas generator including a shaft having an axis of rotation, a fan casing at least partially circumscribing the gas generator, a first baffle portion extending along an axial length of a casing, the first baffle portion extending radially outwardly from an outer surface of the casing and a second baffle portion extending at least partially radially outwardly from the first baffle portion. The second baffle portion further includes a radially inner edge supported by the first baffle portion and a radially outer edge extending proximate an inner surface of a radially outer cowl. The compartment baffle system also includes a gap extending between the radially outer edge and the inner surface.

In yet another embodiment, a method of forming a gas turbine engine fan compartment fire baffle includes coupling a first baffle portion along an axial length of a casing, the first baffle portion including a first radially inner edge, a first radially outer edge, and a first body extending there between, the casing forming a radially inner surface of the fan compartment, the first baffle portion extending radially outwardly from an outer surface of the casing. The method further includes coupling a second baffle portion to the radially outer edge, the second baffle portion extending at least partially radially outwardly from the first radially outer edge. The second baffle portion includes a second radially inner edge supported by the first radially outer edge and a second radially outer edge extending proximate an inner surface of a radially outer cowl, the radially outer cowl forming a radially outer surface of the fan compartment. The method also includes maintaining a gap that extends between the second radially outer edge and the inner surface of the outer cowl.

BRIEF DESCRIPTION OF THE DRAWINGS

FIG. 1 is a longitudinal cross-sectional view of an exemplary high bypass ratio turbofan engine in accordance with an example embodiment of the present disclosure.

FIG. 2 is an axial view of the engine shown in FIG. 1, taken along line 2-2 shown in FIG. 1 and looking aft.

FIG. 3 is an axial view of a single baffle shown in FIG. 2.

FIG. 4 is a side elevation view of the baffle shown in FIG. 2 in accordance with an example embodiment of the present disclosure.

FIG. 5 is a perspective view of the baffle shown in FIG. 2 installed on the engine shown in FIG. 1 in accordance with an example embodiment of the present disclosure.

FIG. 6 is a flow chart of a method of forming a gas turbine engine fan compartment fire baffle.

Although specific features of various embodiments may be shown in some drawings and not in others, this is for convenience only. Any feature of any drawing may be referenced and/or claimed in combination with any feature of any other drawing.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

The following detailed description illustrates embodiments of the disclosure by way of example and not by way of limitation. It is contemplated that the disclosure has general application to analytical and methodical embodiments of mitigating the effects of fire in industrial, commercial, and residential applications.

The following description refers to the accompanying drawings, in which, in the absence of a contrary representation, the same numbers in different drawings represent similar elements.

Figure 1:
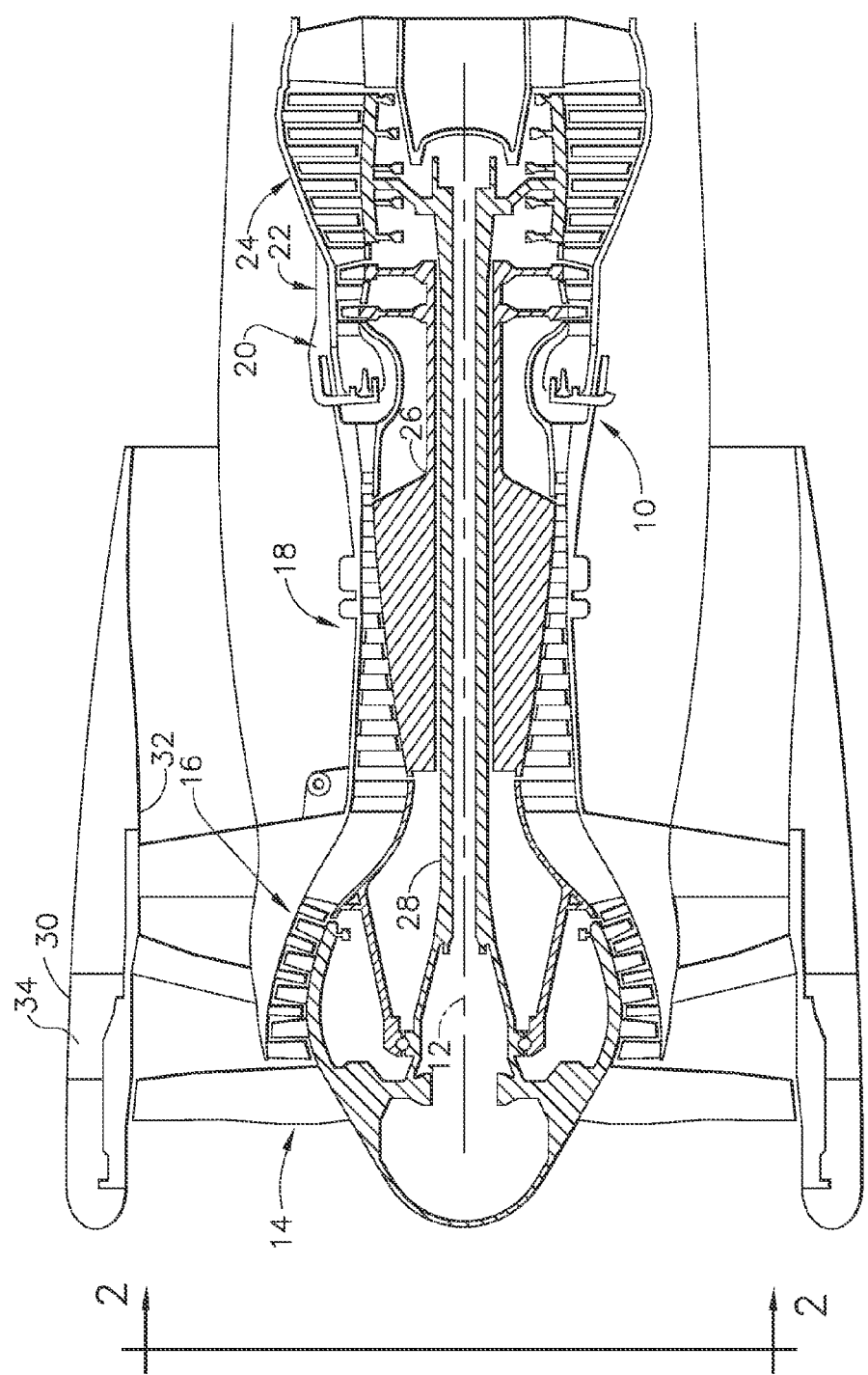
FIGS. 1-6 show example embodiments of the method and apparatus described herein.

FIG. 1 is a longitudinal cross-sectional view of an exemplary high bypass ratio turbofan engine 10. Engine 10 includes, in serial axial flow communication about a longitudinal centerline axis 12, a fan 14, a booster 16, a high pressure compressor 18, a combustor 20, a high pressure turbine 22, and a low pressure turbine 24. High pressure turbine 22 is drivingly connected to high pressure compressor 18 with a first rotor shaft 26, and low pressure turbine 24 is drivingly connected to booster 16 and fan 14 with a second rotor shaft 28. In various embodiments, a plurality of cowls surround portions of engine 10 to direct fluid flow or to protect components from windage. For example, located radially inwardly of a fan cowl 30 and radially outwardly of fan casing 32 is an annular fan compartment 34.

During operation of engine 10, ambient air passes through fan 14, booster 16, and compressor 18, the pressurized air stream enters combustor 20 where it is mixed with fuel and burned to provide a high energy stream of hot combustion gases. The high energy gas stream passes through high pressure turbine 22 to drive first rotor shaft 26. The gas stream passes through low pressure turbine 24 to drive second rotor shaft 28, fan 14, and booster 16. Spent combustion gases exit out of engine 10 through an exhaust duct (not shown).

It should be noted that although the present description is given in terms of a turbofan aircraft engine, embodiments of the present invention may be applicable to any gas turbine engine such as that used for marine, industrial, or stationary applications. The description of the engine shown in FIG. 1 is only illustrative of the type of engine to which some embodiments of the present disclosure are applicable.

Figure 2:
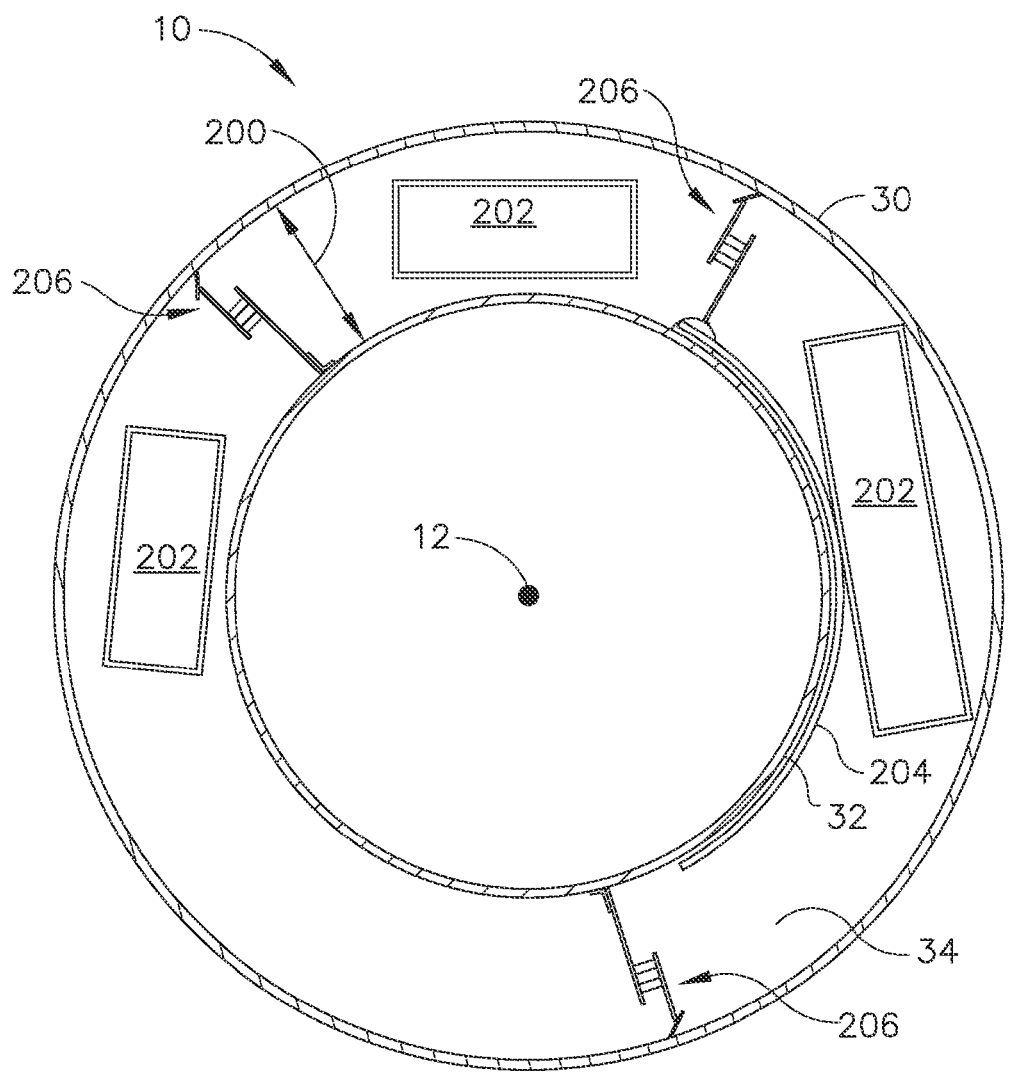

FIG. 2 is an axial view of engine 10 taken along line 2-2 shown in FIG. 1 and looking aft. In the example embodiment, casing 32 circumscribes fan 14 and booster 16 (shown in FIG. 1). Cowl 30 surrounds casing 32 spaced a distance 200 apart. Cowl 30 and casing 32 are concentric about axis 12. Fan compartment 34 includes a plurality of components 202, which in some embodiments, includes piping components 204. One or more baffles 206 are oriented axially and spaced circumferentially about fan compartment 34. Baffles 206 divide fan compartment 34 into circumferentially adjacent sub-compartments for limiting the travel of fire around a substantial circumference of the fan compartment 34. Limiting the amount of travel of a fire limits the circumferential extent of any potential damage to the structural integrity of casing 32 caused by a temperature that exceeds a predetermined range.

Figure 3:
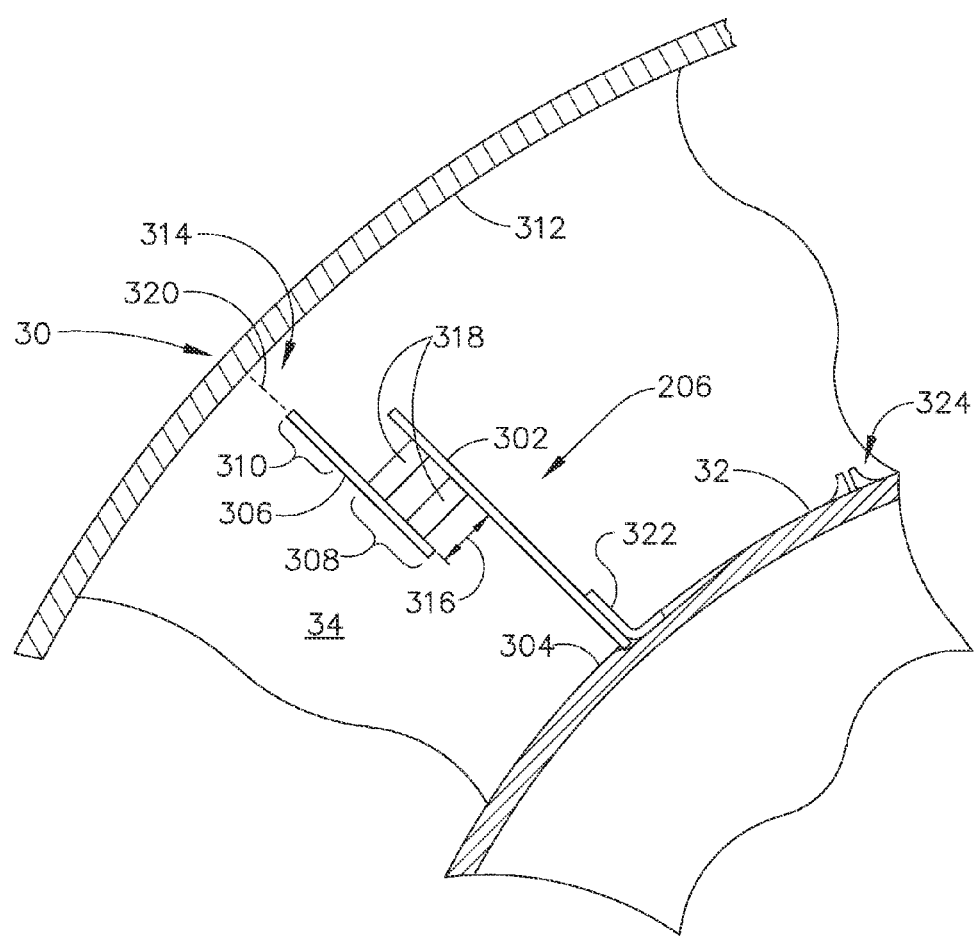

FIG. 3 is an axial view of a single baffle 206 (shown in FIG. 2). In the example embodiment, baffle 206 includes a first baffle portion 302 extending along an axial length of casing 32. First baffle portion 302 extends radially outwardly from an outer surface 304 of casing 32. A second baffle portion 306 extends at least partially radially outwardly from first baffle portion 302. Second baffle portion 306 includes a radially inner edge 308 supported by first baffle portion 302 and a radially outer edge 310 extending proximate an inner surface 312 of radially outer cowl 30. A first gap 314 extends between radially outer edge 310 and inner surface 312. A second gap 316 is maintained between first baffle portion 302 and second baffle portion 306 by one or more spacers 318. Gaps 314 and 316 permit fluid flow past baffle 206 to facilitate cooling flow while limiting an ability of a fire or significant heat to traverse circumferentially about fan compartment 34. In an embodiment, a seal 320, such as a brush seal or bulb seal is used to further limit airflow past baffle 206. First baffle portion 302 is coupled to casing 32 using a hardware fastener, such as, but, not limited to an angle bracket 322. In various embodiments, a buildup 324 of composite material may be used to facilitate attachment of first baffle portion 302 to casing 32.

Figure 4:
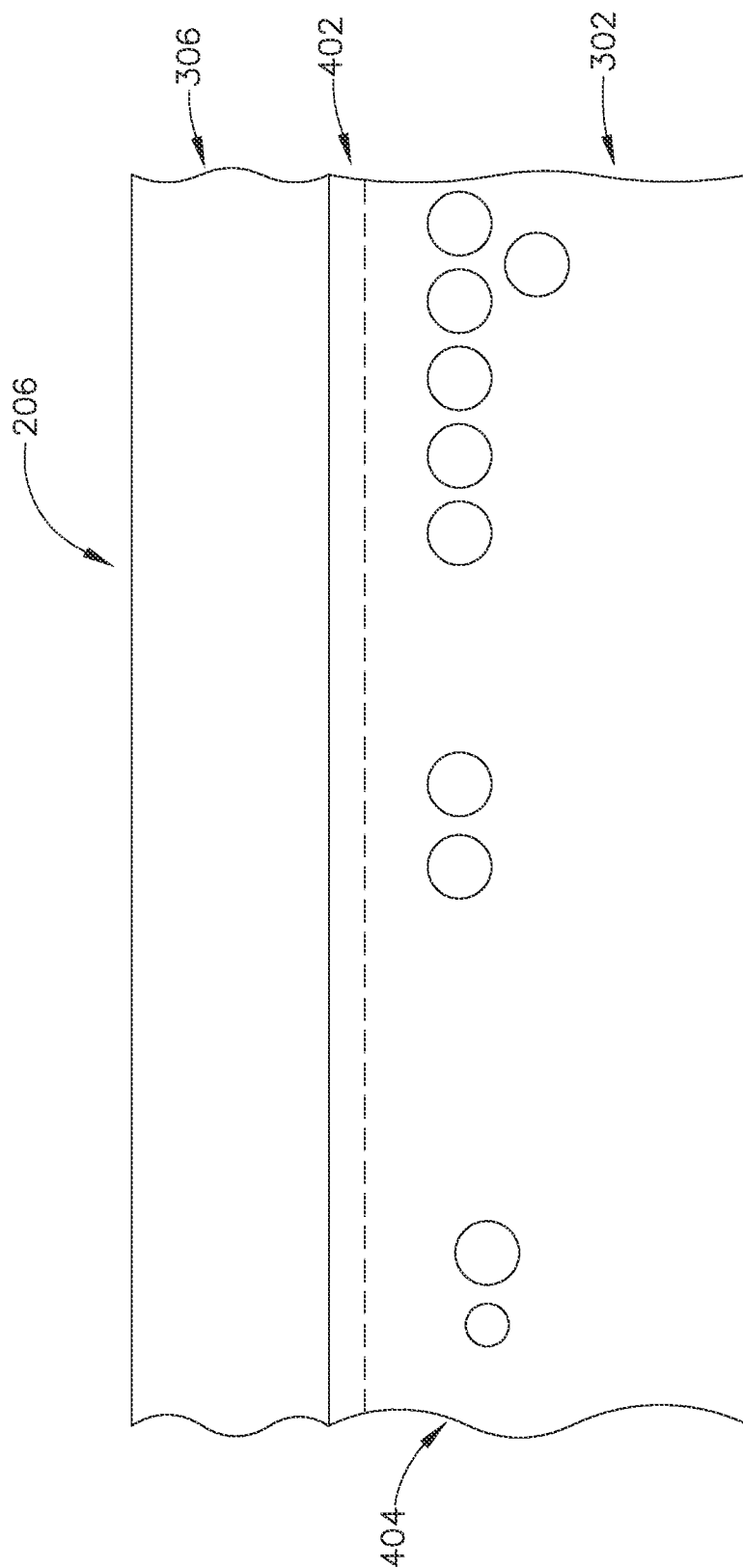

FIG. 4 is a side elevation view of baffle 206 in accordance with an example embodiment of the present disclosure. In the example embodiment, baffle 206 includes first baffle portion 302 and second baffle portion 306. Baffle 206 includes an overlap portion 402 of first baffle portion 302 and second baffle portion 306. In the example embodiment, first baffle portion 302 includes a plurality of apertures 404 complementary to piping and tubing that run through fan compartment 34.

Figure 5:
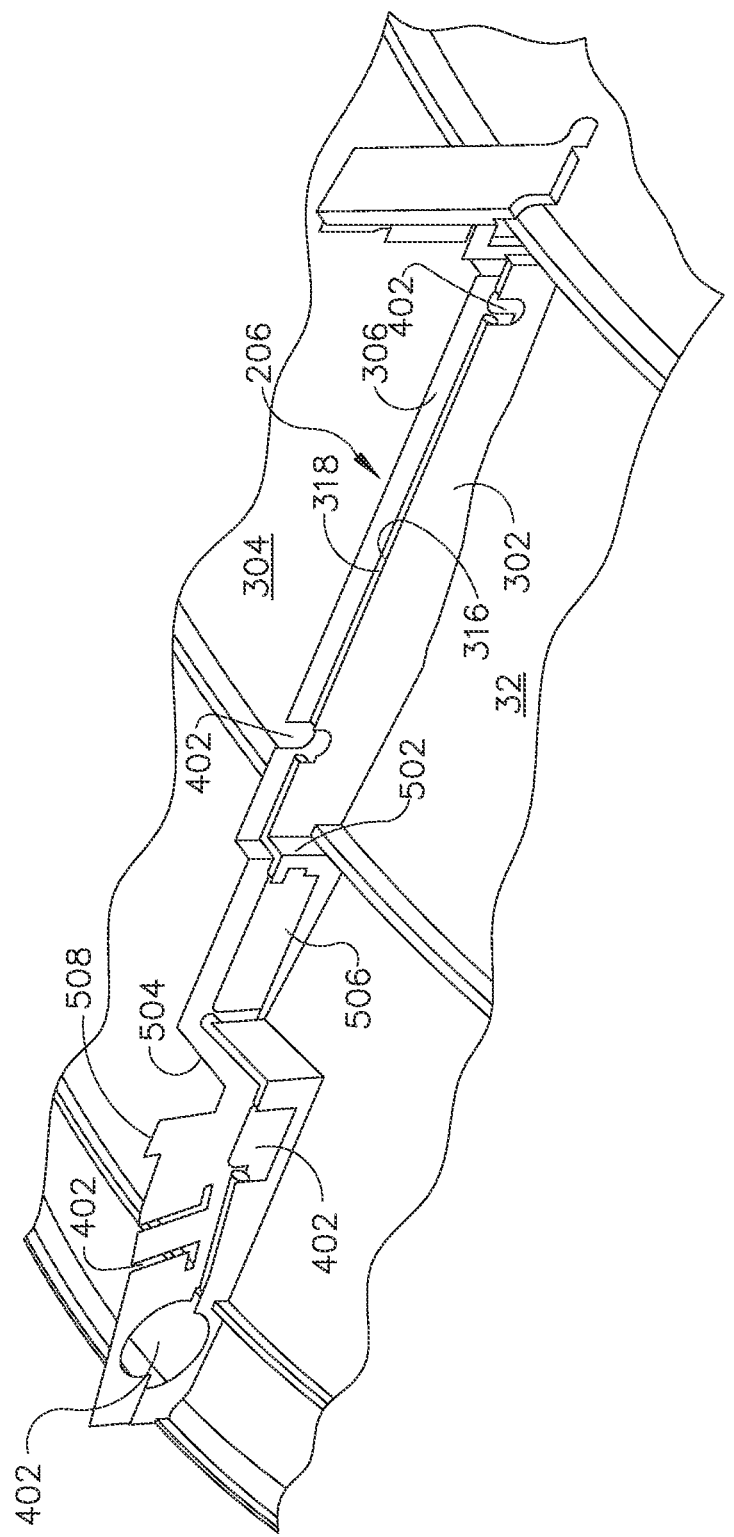

FIG. 5 is a perspective view of baffle 206 installed on engine 10 (shown in FIG. 1) in accordance with an example embodiment of the present disclosure. In the example embodiment, baffle 206 extends axially along outer surface 304 and includes a first jog 502 and a second jog 504 that facilitate avoiding components in a straight-line path of baffle 206. Apertures 404 include circular apertures, slot apertures, and polygonal openings configured to accommodate components, such as, but not limited to cables, conduits, piping, tubing, and devices positioned within fan compartment 34 (shown in FIG. 1). In an area 506, first baffle portion 302 is not needed to a height of a plurality of adjacent components. In another area 508, radially outer edge 310 of second baffle portion 306 is formed to be complementary to a contour of inner surface 312, which may or may not present a smooth and/or continuous planar surface.

Figure 6:
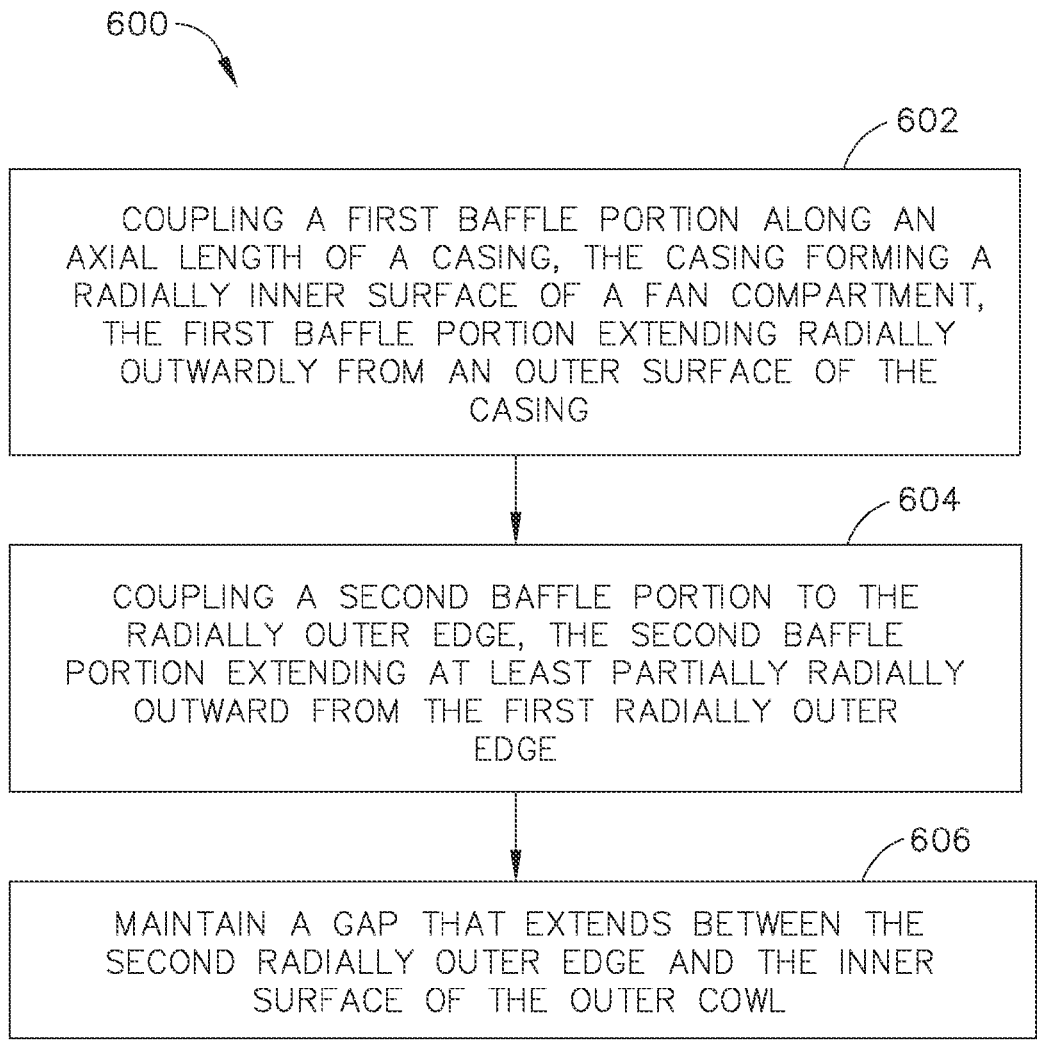

FIG. 6 is a flow chart of a method 600 of forming a gas turbine engine fan compartment fire baffle. Method 600 includes coupling a first baffle portion along an axial length of a casing 602. The first baffle portion includes a first radially inner edge, a first radially outer edge, and a first body extending therebetween. The casing forms a radially inner surface of the fan compartment and the first baffle portion extends radially outwardly from an outer surface of the casing. Method 600 also includes coupling a second baffle portion to the radially outer edge 604. The second baffle portion extends at least partially radially outwardly from the first radially outer edge. The second baffle portion includes a second radially inner edge supported by the first radially outer edge and a second radially outer edge extending proximate an inner surface of a radially outer cowl wherein the radially outer cowl forms a radially outer surface of the fan compartment. Method 600 further includes maintaining a gap that extends between the second radially outer edge and the inner surface of the outer cowl 606.

The above described embodiments of a method and system of segregating areas of an annular compartment provides a cost effective and reliable means for reducing an exposure of a composite casing to fire and/or temperature excursion that is outside a predetermined range. More specifically, the methods and systems described herein facilitate limiting an exposure of the casing, which makes up a surface that defines at least a portion of the compartment boundary, to a temperature that could weaken and/or cause permanent damage to the casing. In addition, the above described methods and systems facilitate maintaining fluid flow through the compartment to facilitate cooling components positioned within the compartment. As a result, the methods and systems described herein facilitate reducing a risk of fire to the structural integrity of the casing while maintaining cooling for components adjacent the casing in a cost effective and reliable manner.

Example methods and apparatus for segregating an annular compartment are described above in detail. The apparatus illustrated is not limited to the specific embodiments described herein, but rather, components of each may be utilized independently and separately from other components described herein. Each system component can also be used in combination with other system components.

This written description uses examples to describe the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A compartment baffle system comprising:
   a first baffle portion extending along an axial length of a casing, said first baffle portion extending radially outwardly from an outer surface of the casing;
   a second baffle portion extending at least partially radially outwardly from said first baffle portion, said second baffle portion comprising:
   a radially inner edge supported by said first baffle portion; and
   a radially outer edge extending proximate an inner surface of a radially outer cowl; and
   a gap extending between said radially outer edge and said inner surface.

2. The compartment baffle system of claim 1, wherein said casing includes a cylindrical cross-section.

3. The compartment baffle system of claim 1, wherein said cowl includes a cylindrical cross-section concentric with a longitudinal axis of said casing.

4. The compartment baffle system of claim 1, wherein said radially inner edge is coupled to a radially outer edge of said first baffle portion.

5. The compartment baffle system of claim 1, wherein said radially inner edge of said second baffle portion is spaced circumferentially from said radially outer edge of said first baffle portion.

6. The compartment baffle system of claim 1, further comprising a spacer positioned between said radially inner edge of said second baffle portion and said radially outer edge of said first baffle portion, said spacer configured to maintain a gap between said radially inner edge of said second baffle portion and said radially outer edge of said first baffle portion.

7. The compartment baffle system of claim 1, further comprising a seal between said cowl and said radially outer edge of said second baffle portion.

8. The compartment baffle system of claim 1, further comprising at least one of a brush seal and a bulb seal between said cowl and said radially outer edge of said second baffle portion.

9. A gas turbine engine comprising:
   a gas generator comprising a shaft having an axis of rotation;
   a fan casing at least partially circumscribing said gas generator;
   a first baffle portion extending along an axial length of said casing, said first baffle portion extending radially outwardly from an outer surface of the casing;
   a second baffle portion extending at least partially radially outwardly from said first baffle portion, said second baffle portion comprising:
   a radially inner edge supported by said first baffle portion; and
   a radially outer edge extending proximate an inner surface of a radially outer cowl; and
   a gap extending between said radially outer edge and said inner surface.

10. The gas turbine engine of claim 9, wherein said casing includes a cylindrical cross-section.

11. The gas turbine engine of claim 9, wherein said cowl includes a cylindrical cross-section concentric with a longitudinal axis of said casing.

12. The gas turbine engine of claim 9, wherein said radially inner edge is coupled to a radially outer edge of said first baffle portion.

13. The gas turbine engine of claim 9, wherein said radially inner edge of said second baffle portion is spaced circumferentially said radially outer edge of said first baffle portion.

14. The gas turbine engine of claim 9, further comprising a spacer positioned between said radially inner edge of said second baffle portion and said radially outer edge of said first baffle portion, said spacer configured to maintain a gap between said radially inner edge of said second baffle portion and said radially outer edge of said first baffle portion.

15. The gas turbine engine of claim 9, further comprising a seal between said cowl and said radially outer edge of said second baffle portion.

16. The gas turbine engine of claim 9, further comprising at least one of a brush seal and a bulb seal between said cowl and said radially outer edge of said second baffle portion.

17. A method of forming a gas turbine engine fan compartment fire baffle, said method comprising:
   coupling a first baffle portion along an axial length of a casing, the first baffle portion including a first radially inner edge, a first radially outer edge, and a first body extending therebetween, the casing forming a radially inner surface of the fan compartment, the first baffle portion extending radially outwardly from an outer surface of the casing;
   coupling a second baffle portion to the radially outer edge, the second baffle portion extending at least partially radially outwardly from the first radially outer edge, the second baffle portion including:
   a second radially inner edge supported by the first radially outer edge; and
   a second radially outer edge extending proximate an inner surface of a radially outer cowl, the radially outer cowl forming a radially outer surface of the fan compartment; and
   maintaining a gap that extends between the second radially outer edge and the inner surface of the outer cowl.

18. The method of claim 17, wherein coupling a first baffle portion along an axial length of a casing comprises coupling a first baffle portion along an axial length of a casing formed of a composite material.

19. The method of claim 17, wherein coupling a plurality of first baffle portions along an axial length of the casing, each of the plurality of first baffle portions spaced circumferentially about the outer surface of the casing.

20. The method of claim 17, wherein coupling a first baffle portion along an axial length of a casing comprises coupling a first baffle portion formed of at least one of a composite material and titanium along an axial length of the casing.

* * * * *